(12) United States Patent
Okino

(10) Patent No.: US 8,654,475 B2
(45) Date of Patent: Feb. 18, 2014

(54) STAMPERS AND MAGNETIC DISKS

(71) Applicant: Kabushiki Kaisha Toshiba, Tokyo (JP)

(72) Inventor: Takeshi Okino, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/741,685

(22) Filed: Jan. 15, 2013

(65) Prior Publication Data

US 2013/0250454 A1    Sep. 26, 2013

(30) Foreign Application Priority Data

Mar. 22, 2012  (JP) .................................. 2012-66053

(51) Int. Cl.
*G11B 15/18* (2006.01)

(52) U.S. Cl.
USPC .......................................................... 360/71

(58) Field of Classification Search
USPC .......................................................... 360/71
See application file for complete search history.

(56) References Cited

U.S. PATENT DOCUMENTS

| | | | |
|---|---|---|---|
| 6,643,082 B1 * | 11/2003 | Belser | 360/48 |
| 7,236,324 B2 * | 6/2007 | Albrecht et al. | 360/75 |
| 8,300,340 B2 | 10/2012 | Sakurai et al. | |
| 8,427,772 B2 * | 4/2013 | Lille et al. | 360/51 |
| 2010/0124638 A1 | 5/2010 | Xiao et al. | |

FOREIGN PATENT DOCUMENTS

| | | |
|---|---|---|
| JP | 2001-189014 | 7/2001 |
| JP | 3576056 | 7/2004 |
| JP | 2006-79827 | 3/2006 |
| JP | 2010123239 | 6/2010 |
| JP | 2011210330 | 10/2011 |

OTHER PUBLICATIONS

Office Action dated Sep. 17, 2013 in counterpart Japanese Patent Application No. 2012-066053 and English-langauge translation thereof.

* cited by examiner

*Primary Examiner* — Mark Blouin
(74) *Attorney, Agent, or Firm* — Nixon & Vanderhye, P.C.

(57) ABSTRACT

A stamper according to an embodiment includes a guide including: a first portion provided in regions to be boundaries between the servo region and the data regions in the bit-patterned medium, the first portion extending in a radial direction; and a second portion connected to the first portion, the second portion having protrusions regularly arranged at predetermined intervals in the radial direction, each of the protrusion having and being located on sides of regions to be the data regions, wherein, of angles formed between at least one of two sides of the triangular shape and a straight line extending in the radial direction, the smaller angle is in the range of 10 to 50 degrees, the two sides extending from a vertex of one of the protrusions.

12 Claims, 18 Drawing Sheets

STAMPERS AND MAGNETIC DISKS

CROSS-REFERENCE TO RELATED APPLICATION

This application is based upon and claims the benefit of priority from prior Japanese Patent Application No. 2012-66053 filed on Mar. 22, 2012 in Japan, the entire contents of which are incorporated herein by reference.

FIELD

Embodiments described herein relate generally to stampers and magnetic disks.

BACKGROUND

In the technical trend toward higher-density magnetic disks (also called hard disks), so-called bit-patterned media that have magnetic-recording magnetic dots segmented by non-magnetic portions have been suggested to reduce degradation of magnetic signals due to thermal fluctuations. According to a suggested method of manufacturing a bit-patterned medium, dots are formed by utilizing the self-assembling capability of a block copolymer, and magnetic dot patterns are obtained by processing the dots. However, controlling dots to be arranged in a perfect array over a wide area is considered particularly difficult. In view of this, there is a technique to control the array by using guide patterns formed with walls or cylindrical portions or the like.

A magnetic disk includes servo region patterns for controlling recording and reproduction, and data region patterns for recording and reproducing data. Normally, different patterns are used as those patterns.

In a case where a self-assembled material is used in the manufacture of a magnetic disk, respective bit patterns are first formed by applying a diblock copolymer solution having a self-assembling capability to the insides of guide patterns that are formed on the substrate surface beforehand through an electron beam lithography process, an imprint process, or a process performed after the electron beam lithography process or the imprint process. An annealing process is then performed to cause microlayer separation into a first component aggregated in dots and a second component coating the dots. After that, the respective dots are self-assembled and are ideally arranged in a hexagonal array. By utilizing the difference in etching characteristics (the etching rate difference) between the first component and the second component, the substrate is processed with the first component or the second component serving as a mask. In this manner, bit patterns can be formed. At this point, the servo regions preferably have servo patterns already formed through the electron beam lithography process, the imprint process, or a process performed after the lithography process or the imprint process. This is because, with the servo patterns already formed, the procedure for magnetically forming the servo patterns with a magnetic head (hereinafter referred to as the servo track write) can be advantageously skipped, and there is no difference between the eccentricity of the disk and the eccentricity at the time of the servo track write. Such a difference causes a problem in cases where the servo track write is performed.

In a case where a self-assembled material is used in the manufacture of a magnetic disk as described above, servo patterns can be formed beforehand in the servo regions through an electron beam lithography process, an imprint process, or a later process.

In general, a servo pattern is a pattern that extends in a radial direction perpendicular to the data track direction, and the boundary between a servo region and a data region is also a pattern that extends in a radial direction. In a hard disk drive, magnetic signal reading and writing are performed with a magnetic head to which an arm operating to draw arc-like trajectories is attached. Therefore, to shorten the seek time, the servo region patterns are preferably formed in arc-like shapes conforming to the arm trajectories.

Meanwhile, the self-assembling capability of a self-assembled material that is tended to become a hexagonal close-packed structure is utilized in the data regions. Therefore, if the boundary between a servo region and a data region is a straight structure with uniform thickness, the distance between the boundary and a post pattern for controlling the array of the self-assembled material dots cannot be kept at a constant value. As a result, the control on the array of the self-assembled material dots cannot be appropriately performed at the boundary portion. Further, if the boundary between a servo region and a data region has an angle that varies with the arm's trajectories, the control on the array at the time of self-assembling is degraded. As a result, synchronous data reading and writing might not be performed in the defective array region.

DETAILED DESCRIPTION

According to an embodiment, there is provided a stamper to be used for manufacturing a bit-patterned medium that includes a plurality of data regions having a plurality of tracks and a servo region located between the data regions, each of the data regions extending in a circumferential direction of the tracks, the servo region extending in a radial direction, the stamper comprising a guide comprising: a first portion provided in regions to be boundaries between the servo region and the data regions in the bit-patterned medium, the first portion extending in a radial direction; and a second portion connected to the first portion, the second portion having protrusions regularly arranged at predetermined intervals in the radial direction, each of the protrusion having and being located on sides of regions to be the data regions, wherein, of angles formed between at least one of two sides of the triangular shape and a straight line extending in the radial direction, the smaller angle is in the range of 10 to 50 degrees, the two sides extending from a vertex of one of the protrusions.

The following is a description of an embodiment, with reference to the accompanying drawings.

First Embodiment

Figure 1:
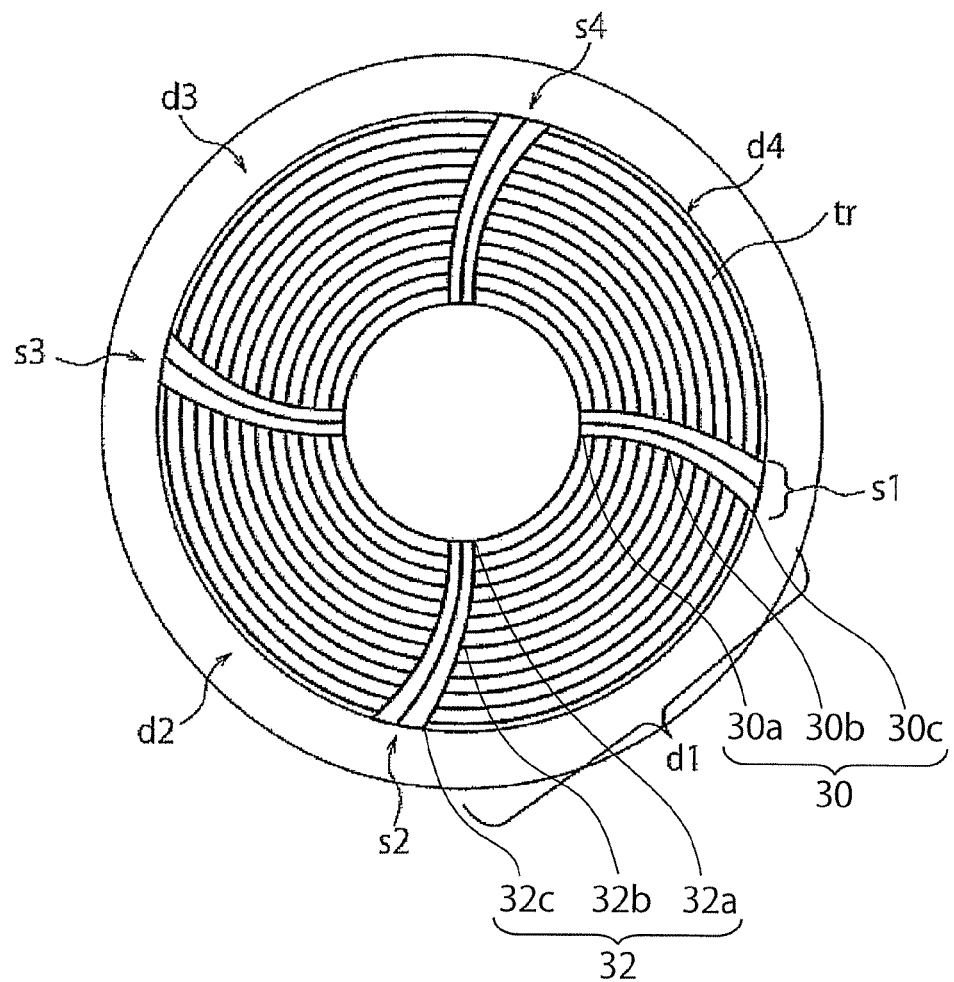
FIG. 1 is a top view of a stamper according to a first embodiment.

Referring to FIGS. 1 to 15, a stamper according to a first embodiment is described. The stamper of this embodiment is used in a case where a magnetic recording medium of a bit-patterned medium type is manufactured through an imprint process. FIG. 1 is a top view of the stamper of this embodiment. The stamper of this embodiment includes data regions d1 to d4, and servo regions s1 to s4 provided between the data regions d1 to d4, for example. Each set of one data region and the servo region corresponding to the one data region is called a sector. Although only four sectors are shown in FIG. 1, hundreds of sectors are generally provided in each one cycle in reality.

Each data region has concentric zones (tracks) zn. In FIG. 1, the servo regions s1 to s4 each having a servo pattern provided for position control are formed into arcs that conform to trajectories of the arm. Each servo pattern includes regions such as a preamble portion for synchronization, an address portion having a servo address written therein, and a burst portion for position control. Here, each servo region does not need to be in one location (within 1 angular position range) in a sector, and sync marks extending in a radial direction to achieve synchronization may be provided at a few locations in each one sector. In this specification, such sync marks are regarded as a kind of servo pattern.

Figure 2:
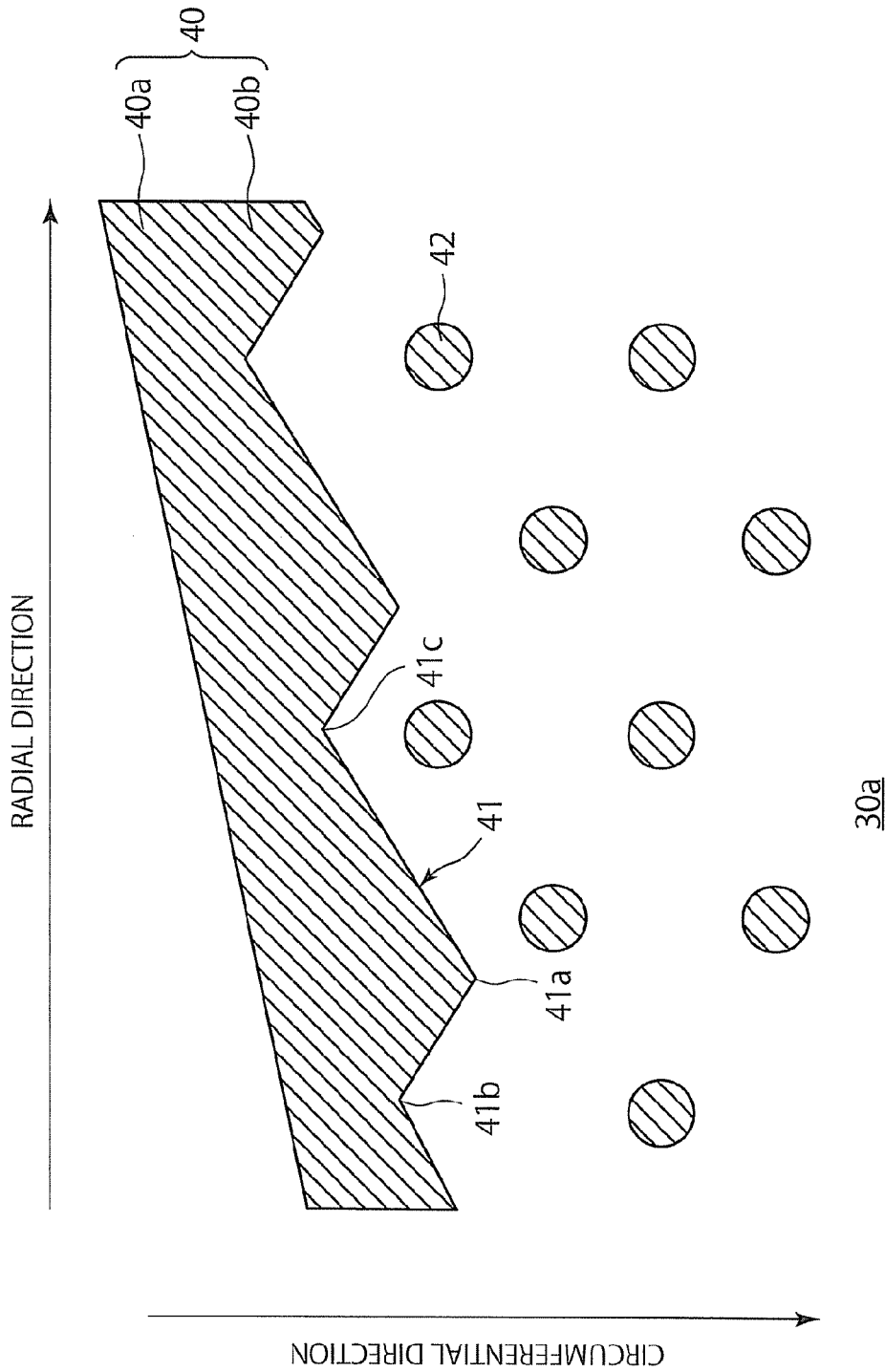
FIG. 2 is a top view showing the shape of a guide on the boundary between a data region and a servo region in the stamper of the first embodiment.
Figure 3:
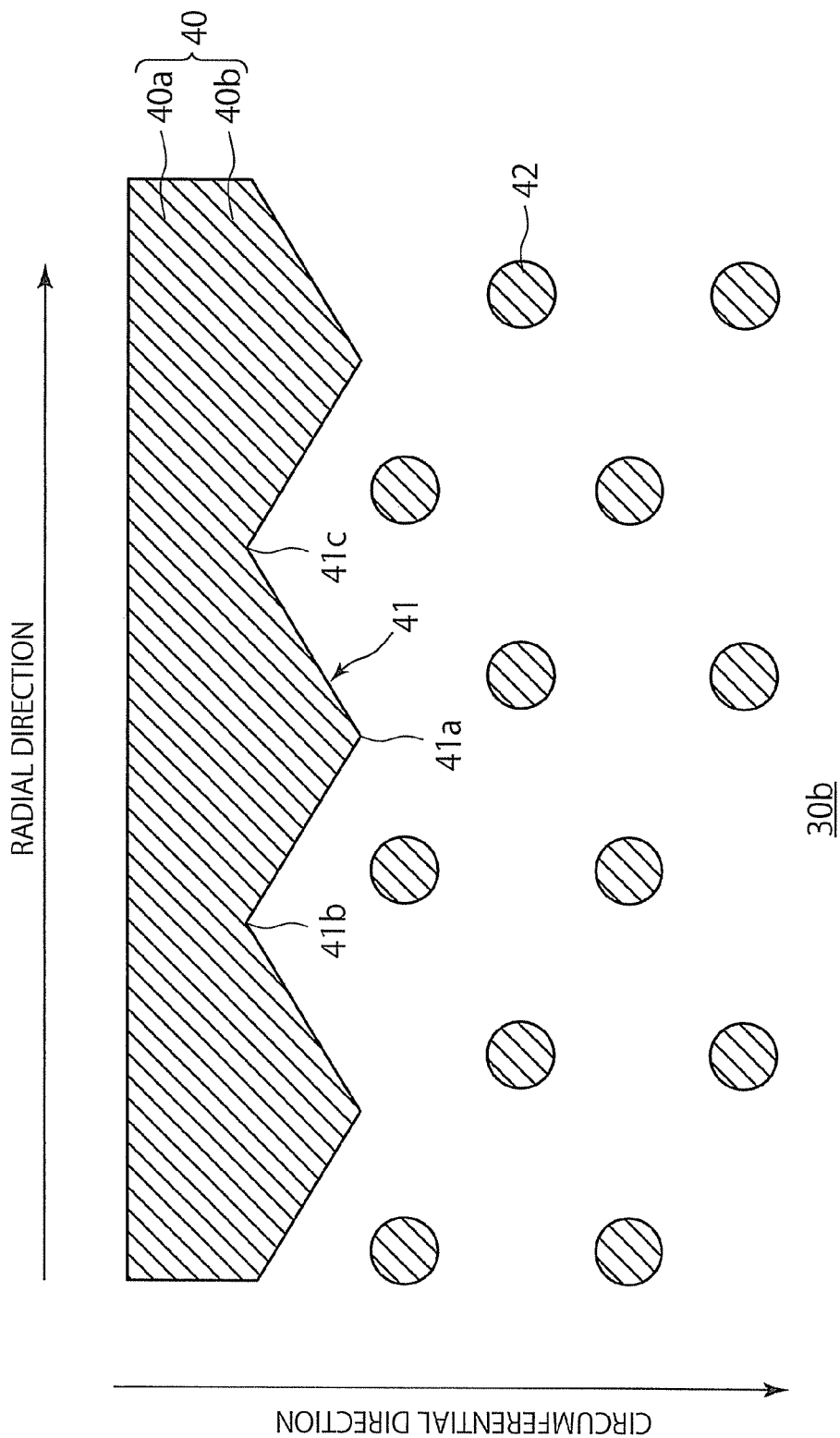
FIG. 3 is a top view showing the shape of a guide on the boundary between a data region and a servo region in the stamper of the first embodiment.
Figure 4:
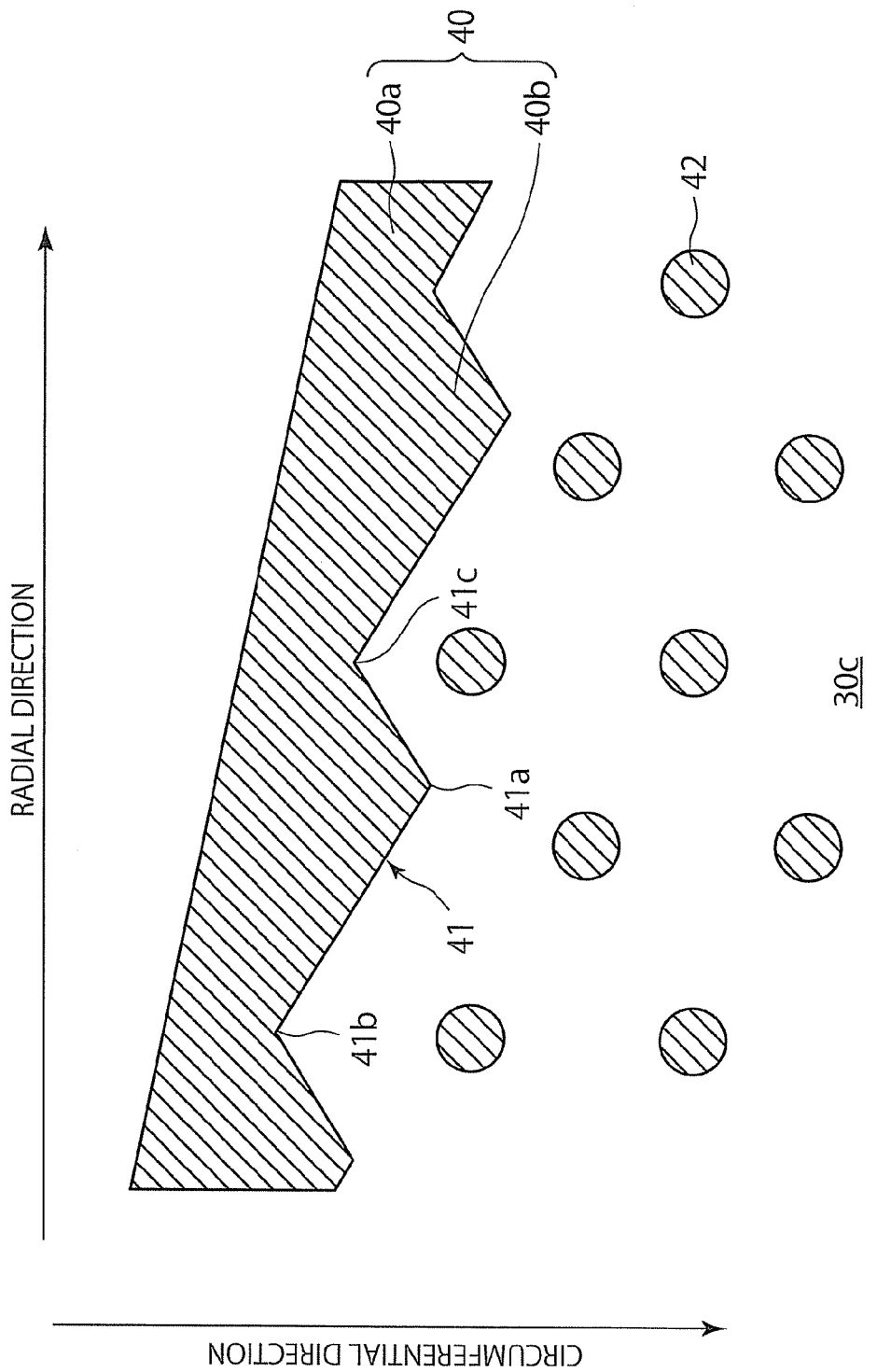
FIG. 4 is a top view showing the shape of a guide on the boundary between a data region and a servo region in the stamper of the first embodiment.
Figure 5:
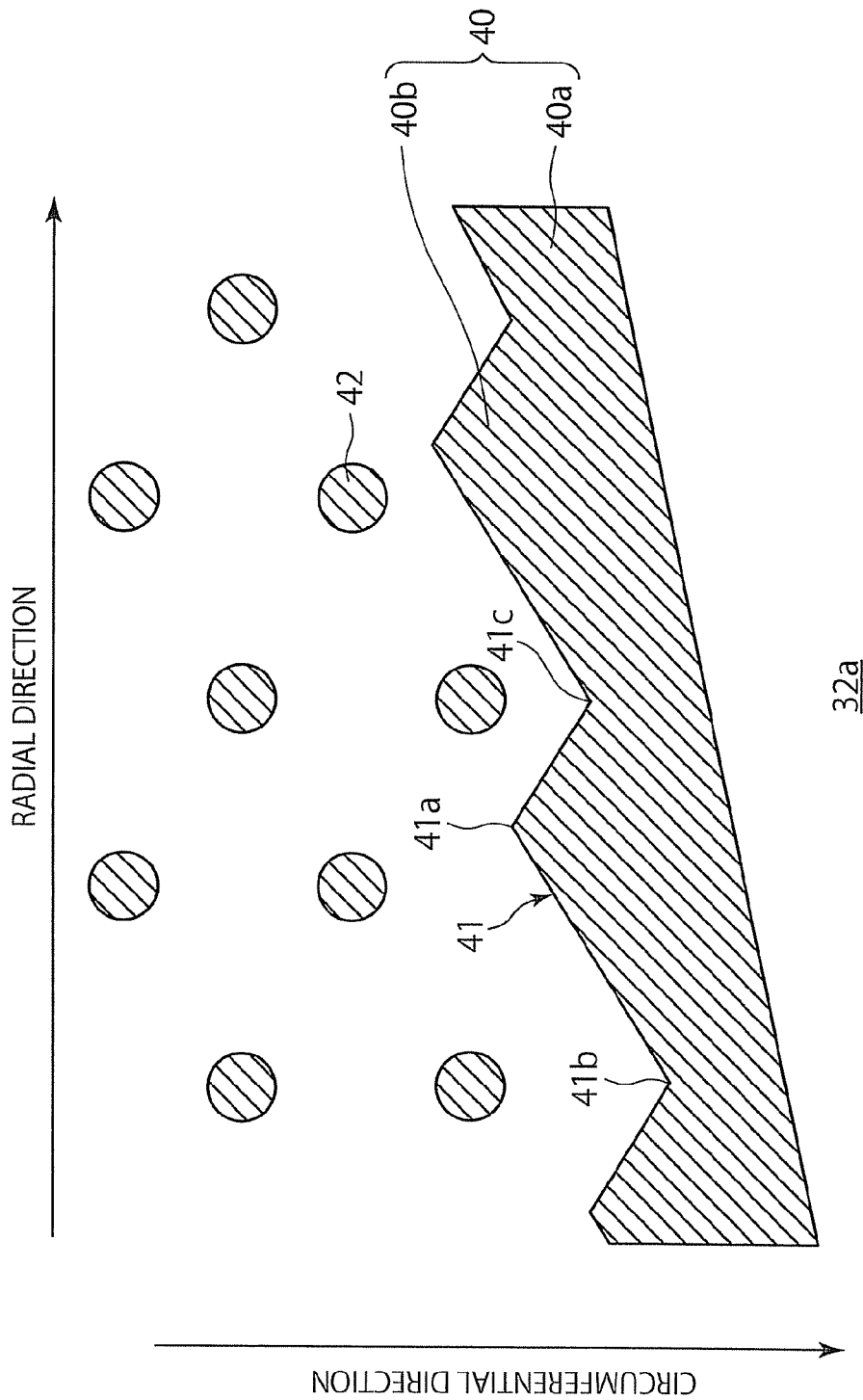
FIG. 5 is a top view showing the shape of a guide on the boundary between a data region and a servo region in the stamper of the first embodiment.
Figure 6:
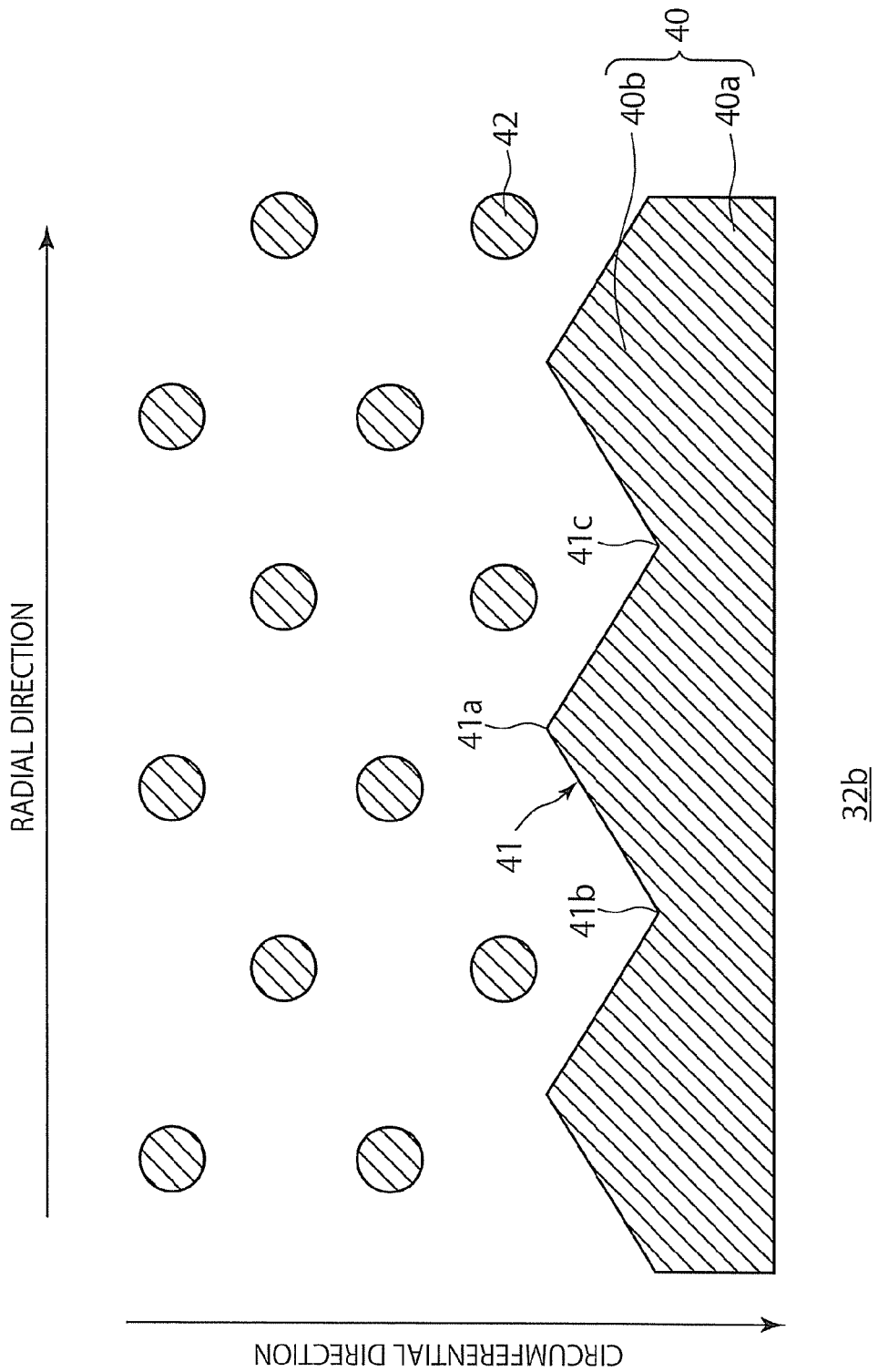
FIG. 6 is a top view showing the shape of a guide on the boundary between a data region and a servo region in the stamper of the first embodiment.
Figure 7:
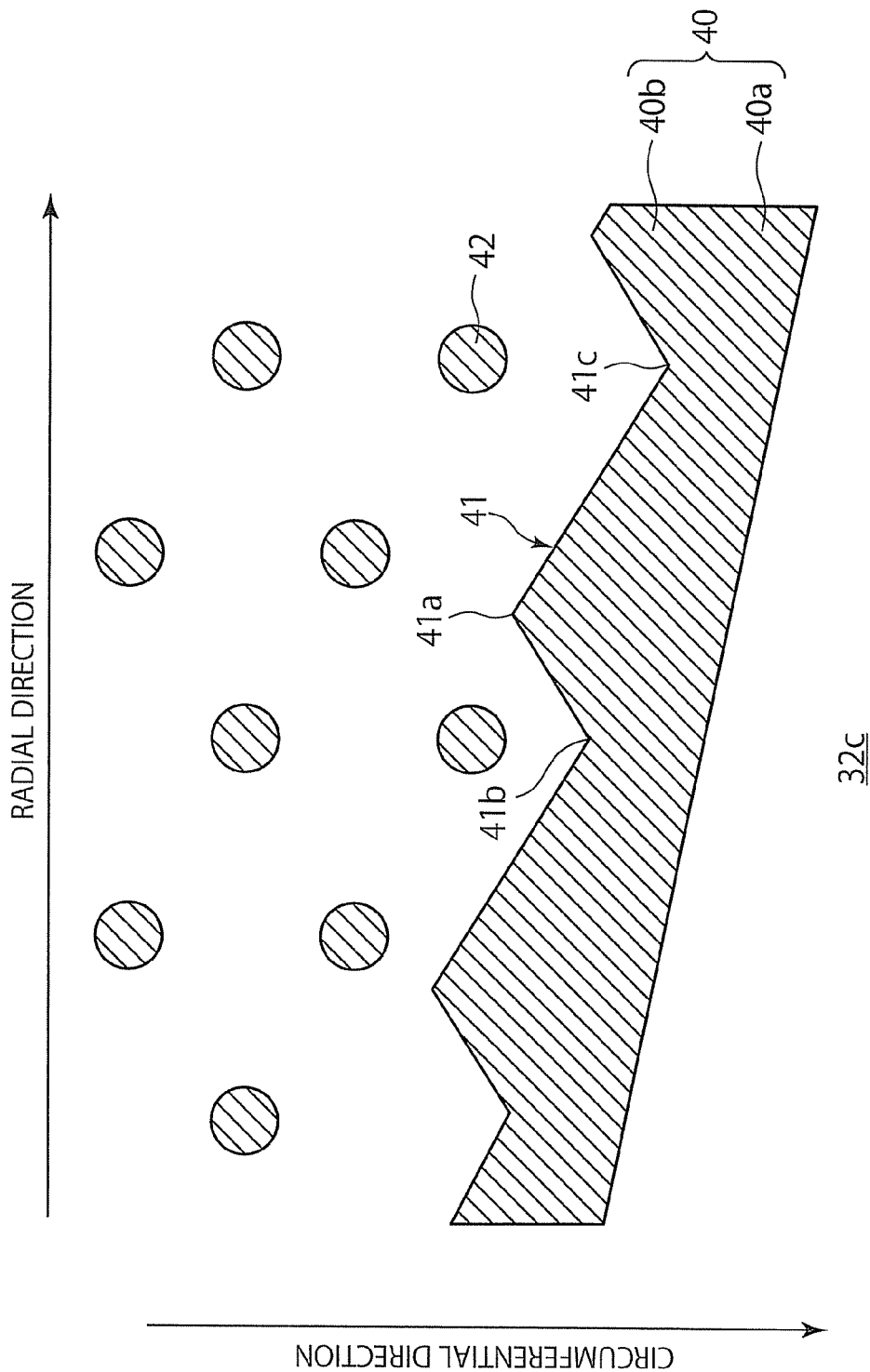
FIG. 7 is a top view showing the shape of a guide on the boundary between a data region and a servo region in the stamper of the first embodiment.

In the stamper of this embodiment, a guide pattern formed with a guide extending in a radial direction is provided on the boundary between each servo region and an adjacent data region. Since each servo region is formed into an arc extending along a trajectory of the arm, each guide pattern is also formed into an arc extending along a trajectory of the arm. Accordingly, on the boundary between each servo region and the corresponding data region, the shape of the guide varies among the inner peripheral portion, the middle portion, and the outer peripheral portion. This aspect is now described in detail. In the stamper of the first embodiment, the data region d1 interposed between two servo region, which are the servo regions s1 and s2, for example, is now described. FIGS. 2 to 4 show the shapes of the guide at the inner peripheral portion 30a, the middle portion 30b, and the outer peripheral portion 30c on the boundary 30 between the servo region s1 and the data region d1. FIGS. 5 to 7 show the shapes of the guide at the inner peripheral portion 32a, the middle portion 32b, and the outer peripheral portion 32c on the boundary 32 between the servo region s2 and the data region d1. As can be seen from FIGS. 2 to 7, each guide 40 provided on the boundary between a servo region and an adjacent data region includes a main portion 40a extending in a radial direction, and a data region boundary portion 40b that is connected to the main portion 40a and is located on the data region side of the main portion 40a. The data region boundary portion 40b has triangular protrusions 41 regularly (cyclically) arranged at predetermined intervals in the radial direction.

At the inner peripheral portion 30a of the boundary 30, the distance from the vertex 41a of each protrusion 41 in the data region boundary portion 40b to the point 41b on the innermost peripheral side of the bottom of the protrusion 41 is shorter than the distance from the vertex 41a to the point 41c on the outermost peripheral side of the bottom of the protrusion 41 (FIG. 2). At the middle portion 30b of the boundary 30, the distance from the vertex 41a of each protrusion 41 in the data region boundary portion 40b to the point 41b on the innermost peripheral side of the bottom of the protrusion 41 is substantially equal to the distance from the vertex 41a to the point 41c on the outermost peripheral side of the bottom of the protrusion 41 (FIG. 3). At the outer peripheral portion 30c of the boundary 30, the distance from the vertex 41a of each protrusion 41 in the data region boundary portion 40b to the point 41b on the innermost peripheral side of the bottom of the protrusion 41 is longer than the distance from the vertex 41a to the point 41c on the outermost peripheral side of the bottom of the protrusion 41 (FIG. 4).

On the other hand, at the inner peripheral portion 32a of the boundary 32, the distance from the vertex 41a of each protrusion 41 in the data region boundary portion 40b to the point 41b on the innermost peripheral side of the bottom of the protrusion 41 is longer than the distance from the vertex 41a to the point 41c on the outermost peripheral side of the bottom of the protrusion 41 (FIG. 5). At the middle portion 32b of the boundary 32, the distance from the vertex 41a of each protrusion 41 in the data region boundary portion 40b to the point 41b on the innermost peripheral side of the bottom of the protrusion 41 is substantially equal to the distance from the vertex 41a to the point 41c on the outermost peripheral side of the bottom of the protrusion 41 (FIG. 6). At the outer peripheral portion 32c of the boundary 32, the distance from the vertex 41a of each protrusion 41 in the data region boundary portion 40b to the point 41b on the innermost peripheral side of the bottom of the protrusion 41 is shorter than the distance from the vertex 41a to the point 41c on the outermost peripheral side of the bottom of the protrusion 41 (FIG. 7).

In each of the data regions, a post pattern formed with posts 42 is provided so that diblock copolymer dots are ideally arranged in a hexagonal fashion (FIGS. 2 to 7). At least one of the posts 42 preferably exists in each 300 nm square, so as to appropriately control the array of self-assembled diblock copolymer dots.

Figure 8:
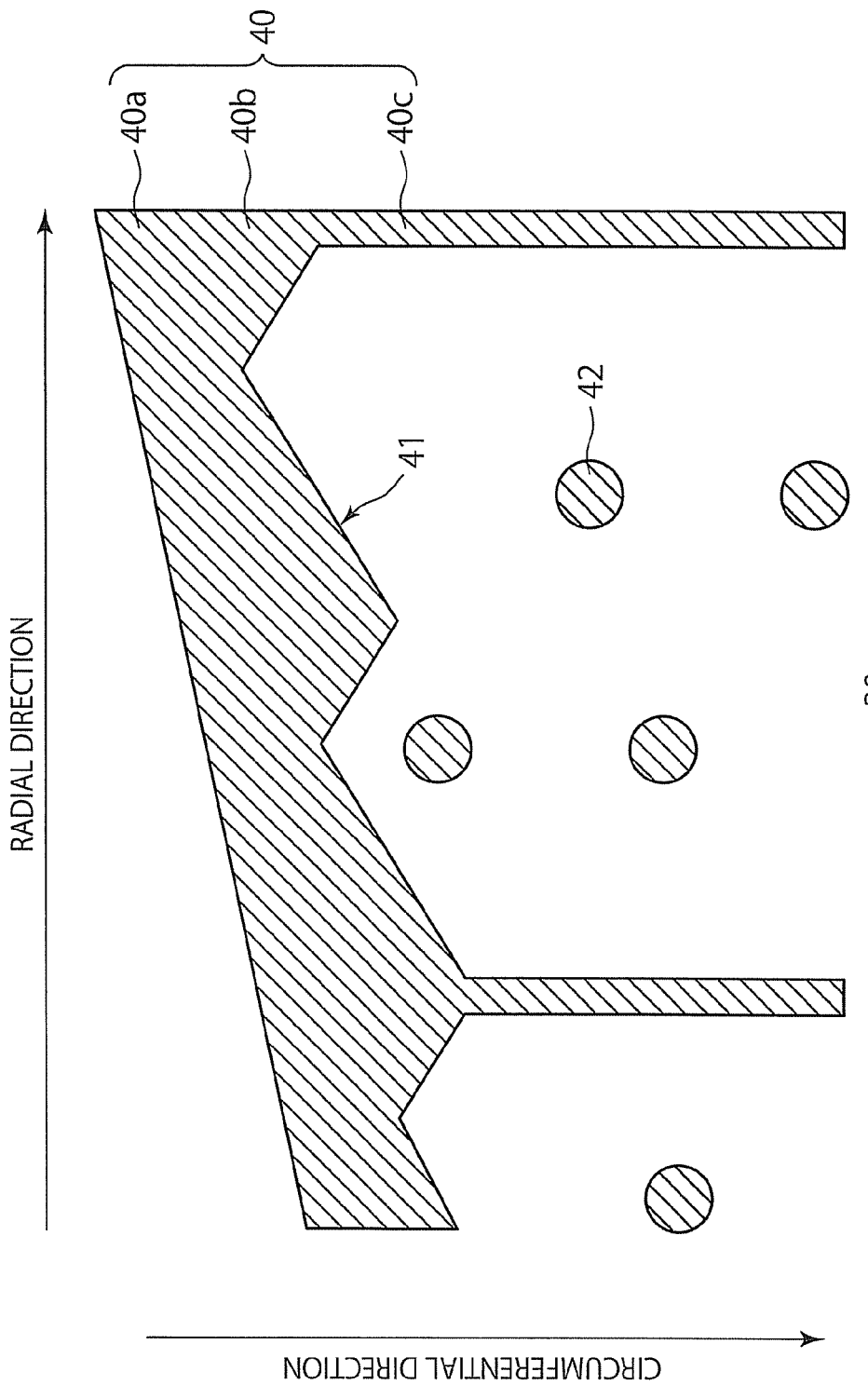
FIG. 8 is a top view showing the shape of a guide on the boundary between a data region and a servo region in the stamper of a first modification of the first embodiment.
Figure 9:
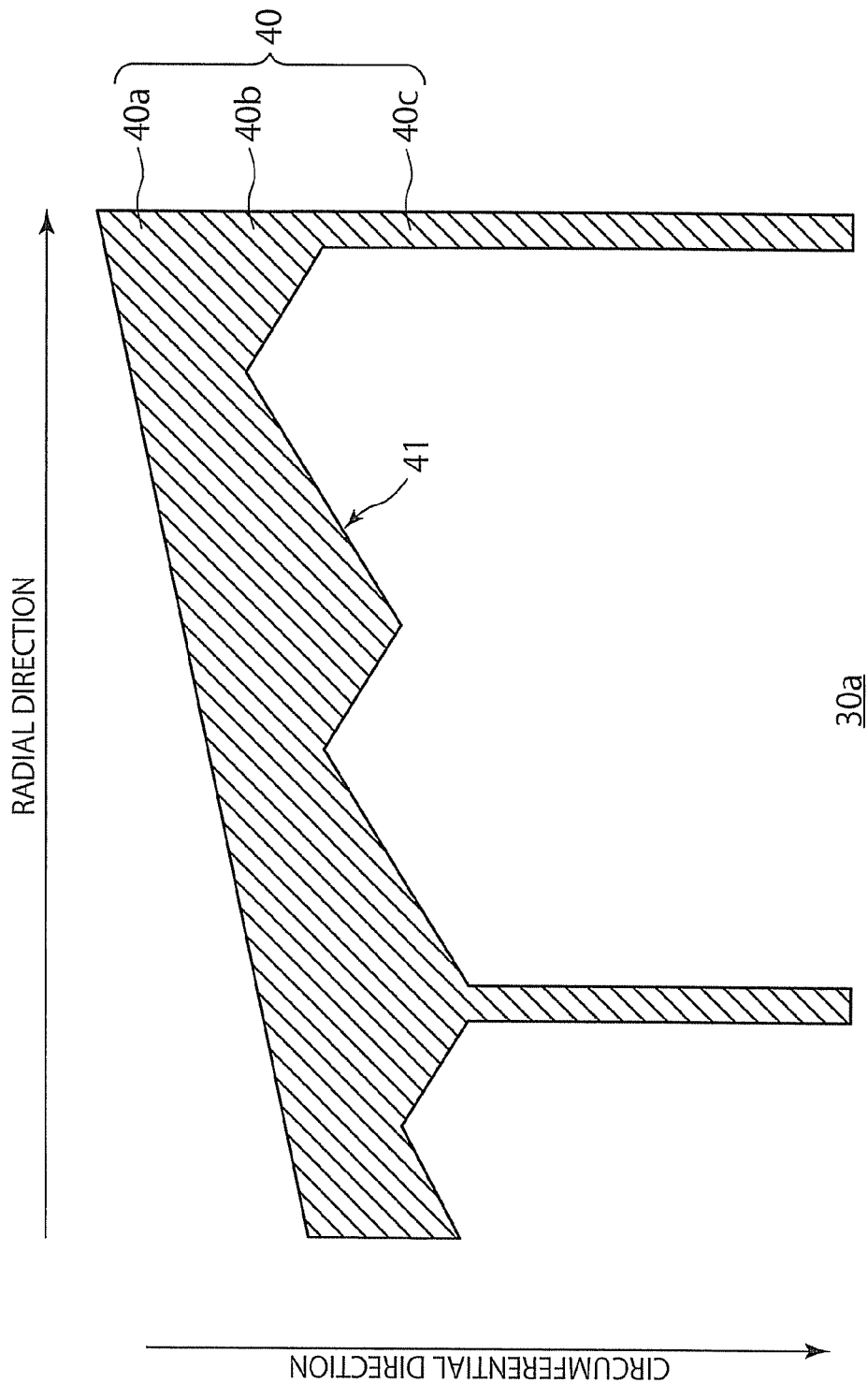
FIG. 9 is a top view showing the shape of a guide on the boundary between a data region and a servo region in the stamper of a second modification of the first embodiment.
Figure 10:
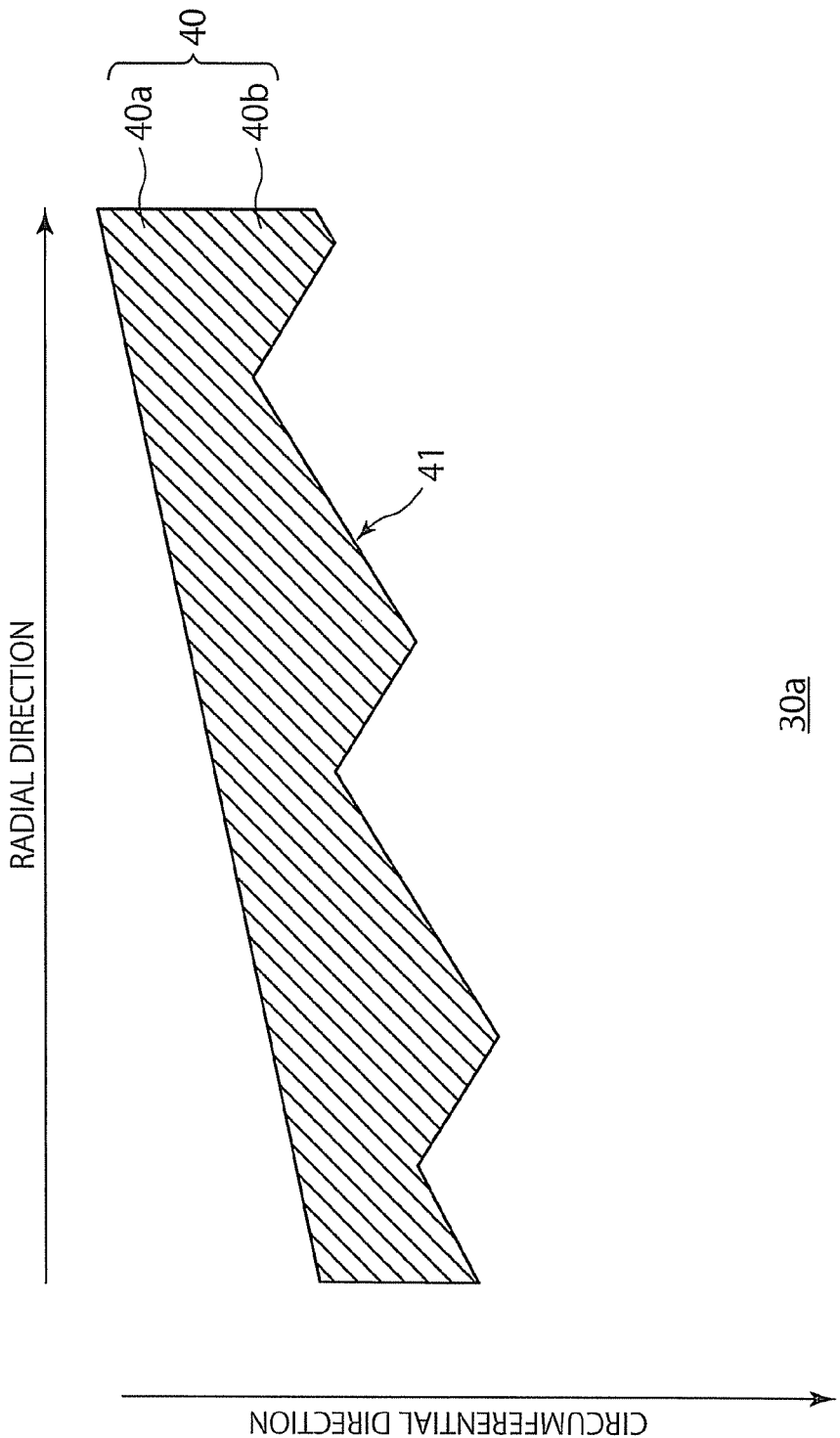
FIG. 10 is a top view showing the shape of a guide on the boundary between a data region and a servo region in the stamper of a third modification of the first embodiment.
Figure 11:
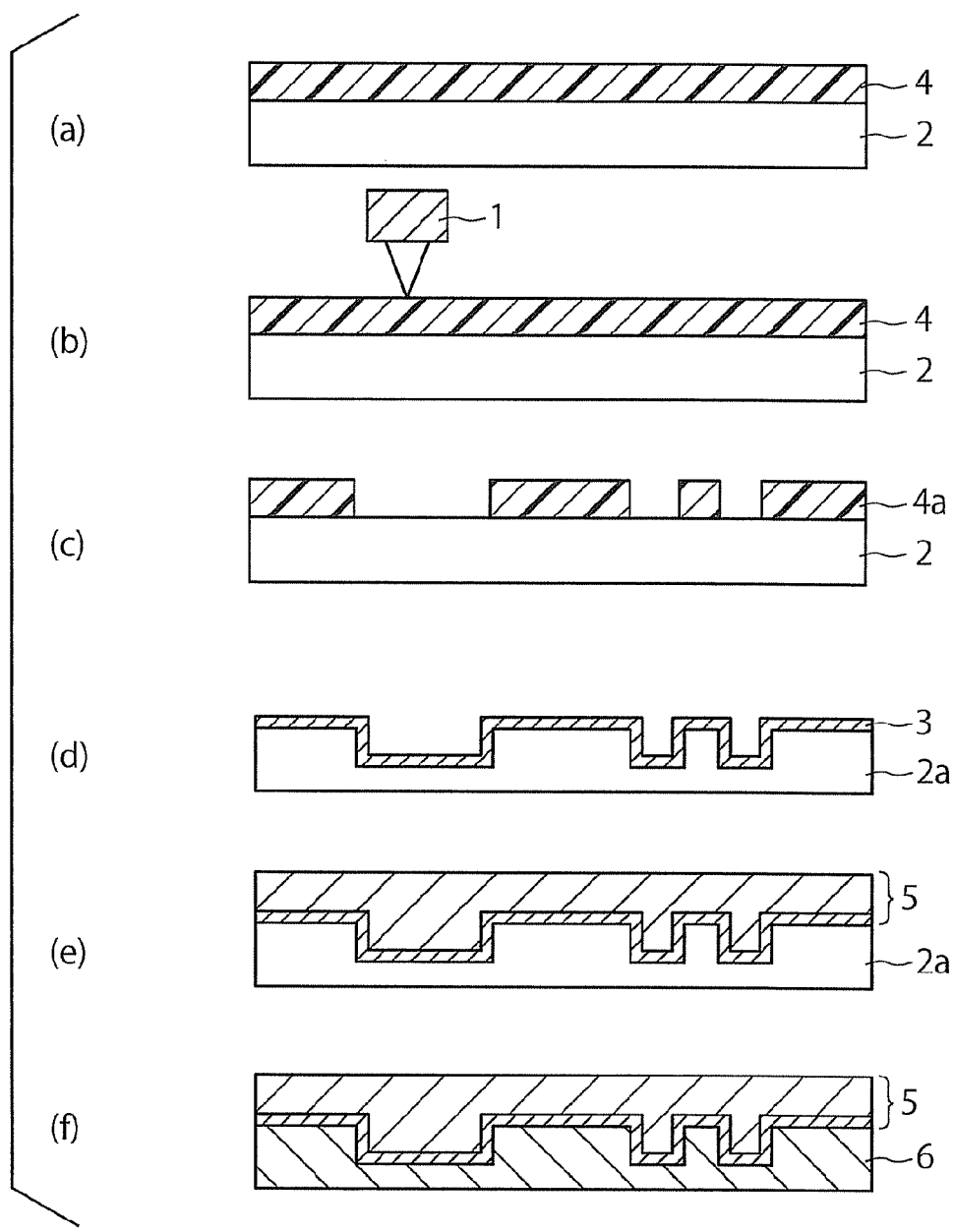
FIGS. 11(a) to 11(f) are cross-sectional views illustrating a method of manufacturing the stamper of the first embodiment.
Figure 12:
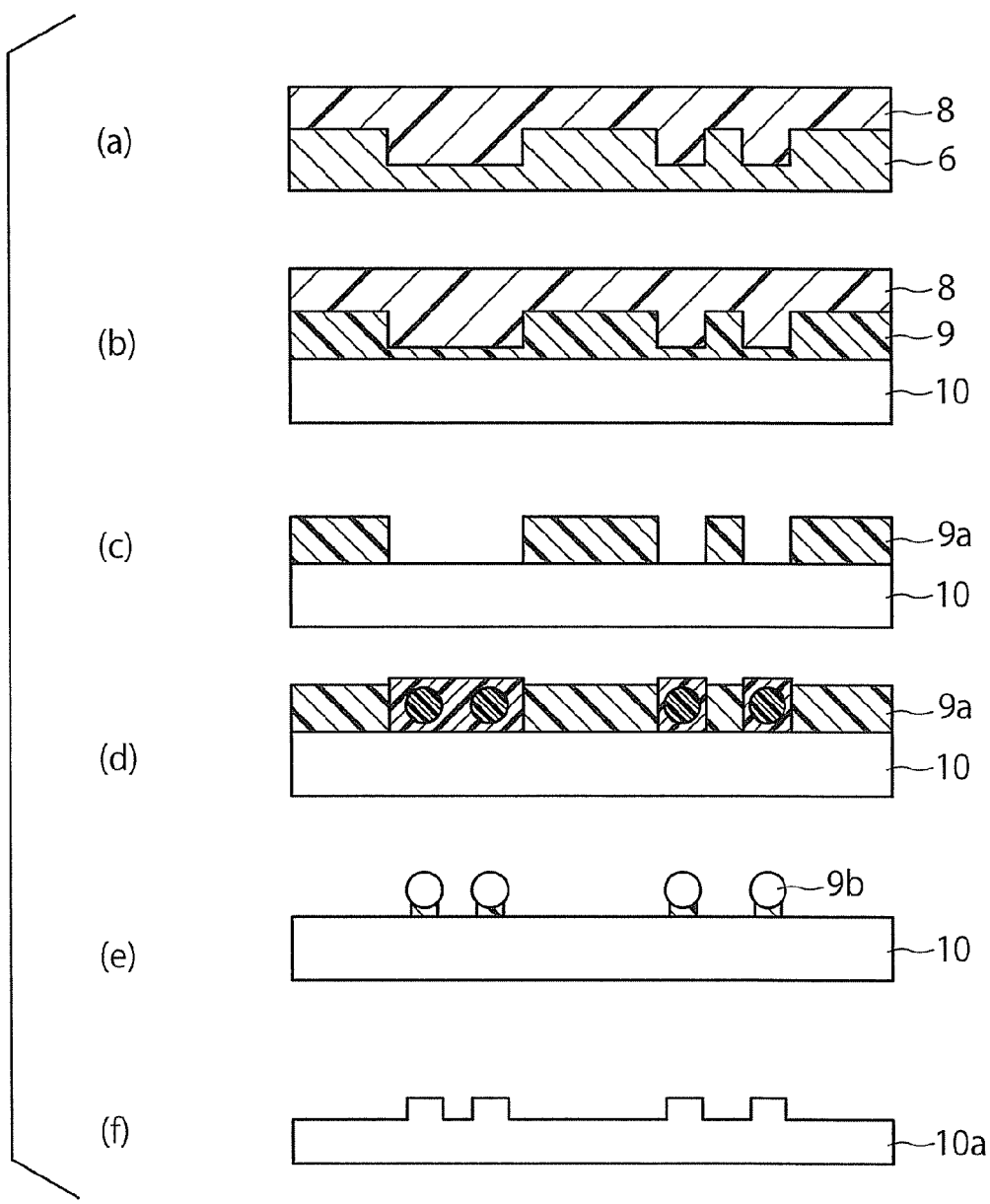
FIGS. 12(a) to 12(f) are cross-sectional views illustrating a method of manufacturing the stamper of the first embodiment.
Figure 13:
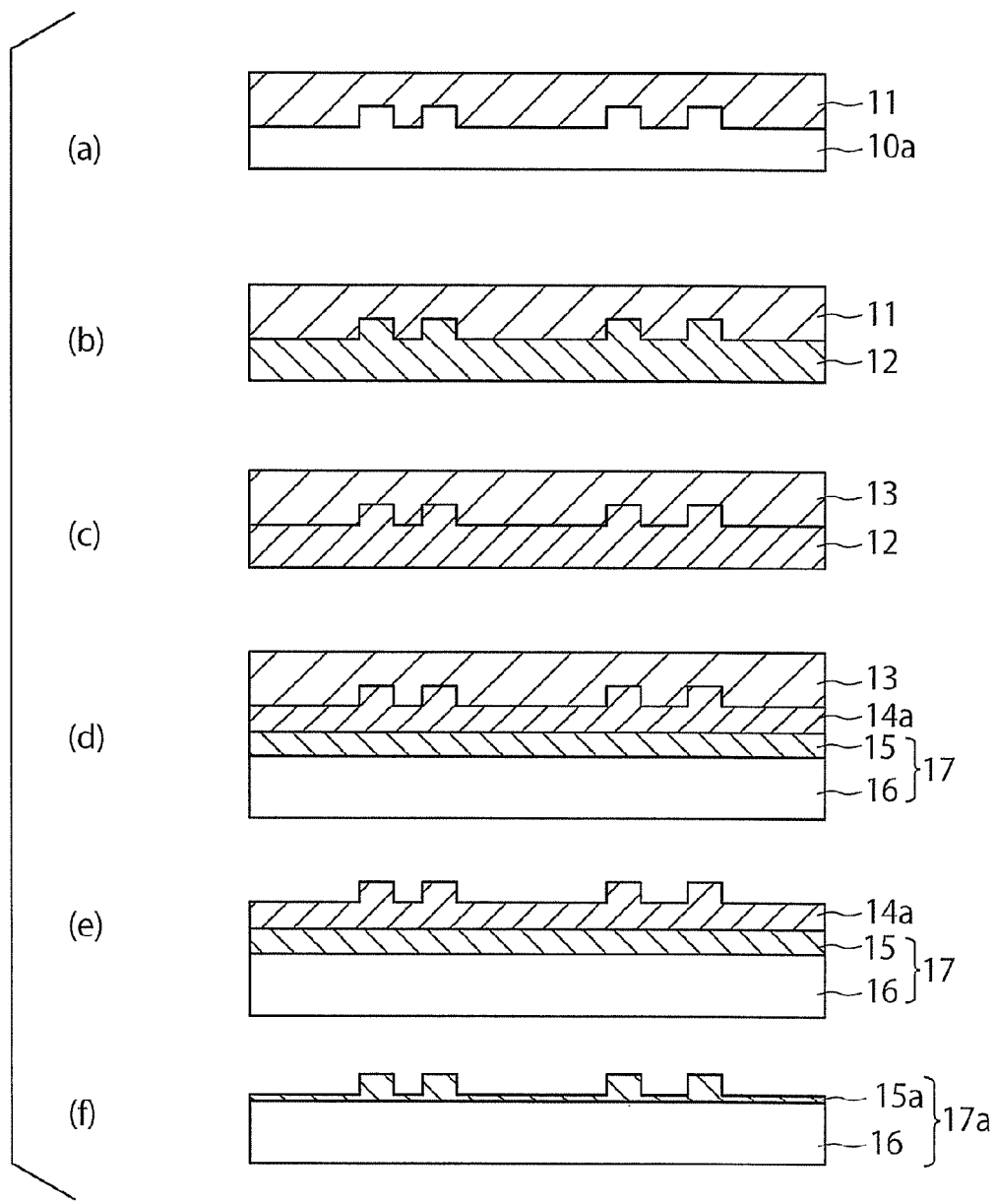
FIGS. 13(a) to 13(f) are cross-sectional views for explaining a method of manufacturing a magnetic recording medium using the stamper.

As shown in FIG. 8, as well as the post pattern formed with the posts 42, guide extending portions 40c that extend from each guide 40 in a circumferential direction can be provided in each of the data regions. The guide extending portions 40c are also used to properly arrange the dots. Also, as shown in FIG. 9, the post pattern cannot be provided while the guide extending portions 40c are provided. Also, as shown in FIG. 10, neither the post pattern nor the guide extending portions 40c can be provided. FIGS. 8 to 10 each show the guide 40 at the inner peripheral portion 30a of each of the boundaries 30. Each of the guides 40, the guide extending portions 40c, and the posts 42 in the stamper has a convex shape when viewed from the data regions. That is, in each of FIGS. 2 to 10, each of those portions protrudes toward the near side of the drawing. In a case where those portions are transferred onto a recording medium, however, each of the guides 40, the guide extending portions 40c, and the posts 42 has a concave shape.

Figure 14:
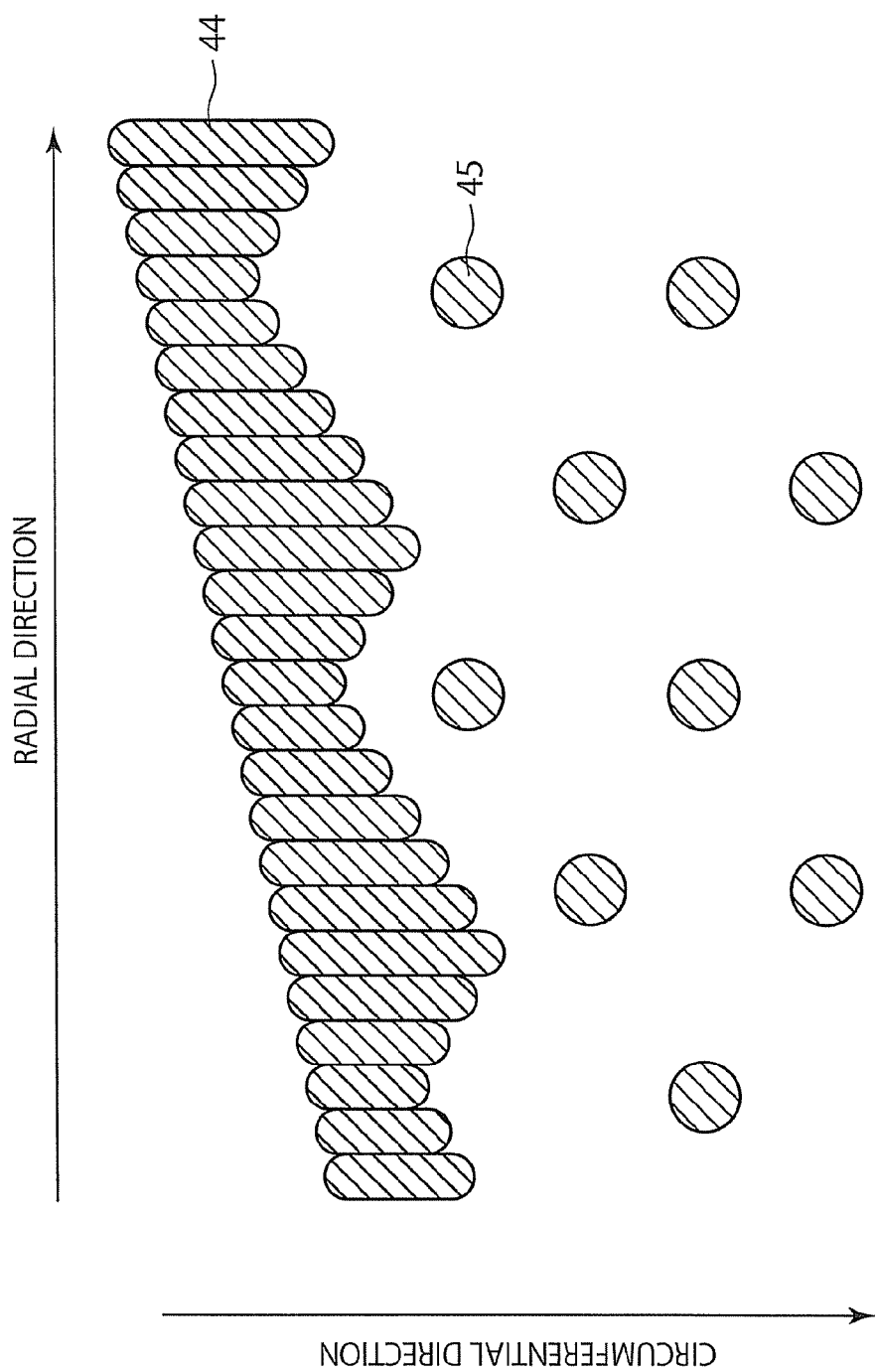
FIG. 14 is a diagram for explaining electron beam lithography for forming guides and posts.
Figure 15:
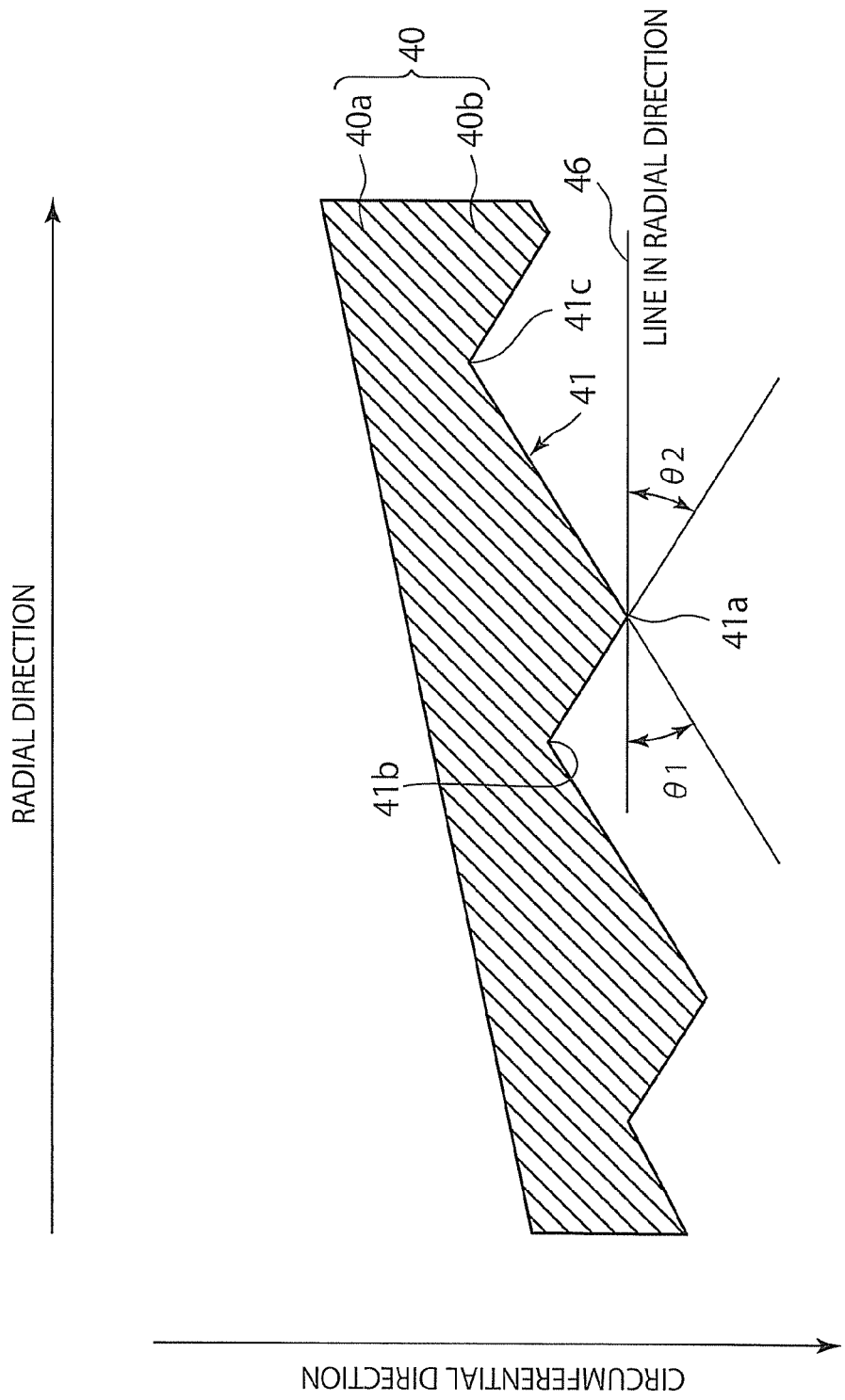
FIG. 15 is a diagram for explaining a preferred shape of a guide.
Figure 16:
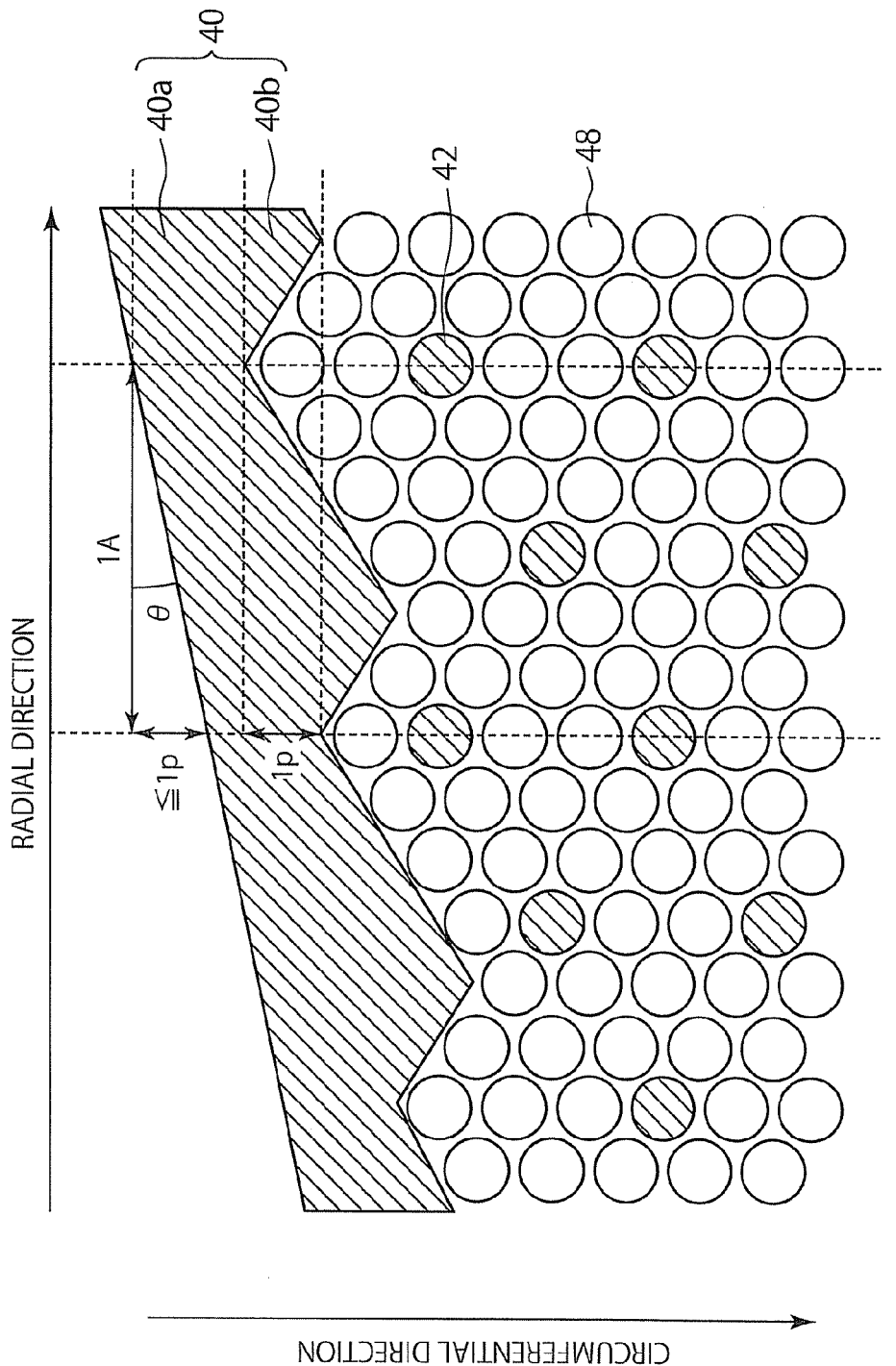
FIG. 16 is a diagram for explaining a preferred shape of a guide.

Referring now to FIGS. 11(a) to 16, a method of manufacturing the stamper of this embodiment and a magnetic disk using the stamper is described. FIGS. 11(a) to 13(f) are cross-sectional views for explaining the procedures for manufacturing the stamper of the first embodiment and the magnetic disk using the stamper. FIG. 14 is a diagram showing a latent image of a guide 40. FIG. 15 is a diagram for explaining the shape of each of the protrusions of a guide 40. FIG. 16 is a diagram for explaining preferred intervals of the protrusions of a guide 40.

First, a photosensitive resin (hereinafter referred to as a resist) 4 is applied onto a substrate 2 (see FIG. 11(a)). The resist 4 is exposed to an electron beam by an electron beam lithography apparatus 1, as shown in FIG. 11(b). At this point, latent images of the post patterns and the guide patterns to be used for controlling the array of dots of a self-assembled material in a later procedure, and a latent image of servo patterns are formed. So as to form a torus-shaped magnetic disk pattern, it is preferable to use an electron beam lithography apparatus that includes a movement mechanism that moves the stage in one horizontal direction and a rotation mechanism that rotates the stage.

In a case where a self-assembled material is used, guide grooves and the post pattern for controlling the array of the self-assembled material dots can be formed at the same time as the formation of the guides 40 in the electron beam lithography procedure. For example, the guide extending portions 40c and the posts 42 can be formed at the same time as the formation of the guides 40, as shown in FIG. 8. Also, the post pattern formed with the posts 42 can be formed at the same time as the formation of the guides 40, as shown in FIG. 2. The guide extending portions 40c can be formed at the same time as the formation of the guides 40, as shown in FIG. 9. Also, neither the post pattern nor the guide extending portions 40c can be formed, and only the guides 40 can be formed, as shown in FIG. 10.

At this point, the exposure is cyclically increased and decreased in synchronization with the revolutions of the stage of the electron beam lithography device, so that a latent image 44 of triangular protrusions with cyclic nature can be formed in the boundary portion between each servo region and an adjacent data region, as shown in FIG. 14. In FIG. 14, reference numeral 45 indicates latent images of the posts 42.

The smaller angle θ1 or θ2 of the angles formed by a radial direction line 46 and at least one of the two sides extending from a vertex 41a forming a protrusion 41 of the triangular pattern being formed in this procedure is in the range of 10 to 50 degrees, or preferably, in the range of 20 to 40 degrees, or more preferably, in the range of 30±5 degrees. With this design, the self-assembled material can be easily arranged in a hexagonal form in a later procedure, with a circumferential direction serving as an axis.

Where the magnetic head to be combined with the magnetic recording medium to be manufactured operates while drawing an arc-like trajectory on the magnetic recording medium in accordance with the angle at which the arm having the head mounted thereon operates, θ represents the smaller one of the angles formed by the tangent line of the trajectory in the position of a radius r and a radial direction of the magnetic recording medium, A represents one radial cycle of the triangular protrusions 41 to be formed, and p represents the pitch of the magnetic dots in the data regions to be formed, for example. If the following relationship is satisfied, $$(m-1)p < nA \tan \theta \leq mp \, (m \text{ and } n \text{ being natural numbers}),$$

a triangular pattern is preferably formed so that the cycles of the protrusions 41 in a circumferential direction shift by mp in a circumferential direction, which is the arm's trajectory direction, with respect to one cycle nA of n protrusions 41 in the radial direction in the position of the radius r.

For example, if the following relationship is satisfied, $$0 < A \tan \theta \leq p \, (m \text{ and } n \text{ being } 1),$$

the triangular pattern is preferably formed so that the cycles of the protrusions 41 in a circumferential direction shift in the circumferential direction same as the direction of the servo pattern to be formed along the arm's trajectory by an amount equivalent to the pitch p of the magnetic dots 48 in the data regions to be formed later, with respect to one cycle A of the protrusions 41 in a radial direction, as shown in FIG. 15. This design is preferable because the areas of the guide patterns formed in the boundary portions would be made smaller and uniform, and imprint defects due to loss of the magnetic formation region or patterns with various thicknesses at the time of imprint would be reduced. At this point, the ratio between the lengths of the two sides forming a protrusion 41 in the triangular cycles is preferably varied in accordance with the tilt of the pattern in accordance with the position of the radius or the arm's trajectory in order to form as many magnetic dots as possible in the data regions.

Referring back to FIG. 11(b), after the electron beam lithography is performed in the above manner, the resist 4 is developed with a developing solution to form a resist pattern 4a to be the resist master (see FIG. 11(c)).

In the above manufacturing procedure, a positive resist is used. However, a negative resist can also be used. In that case, the electron beam irradiation portions and the non-irradiation portions are switched, and the patterns can be reversed in a later procedure. A post-bake process can be performed prior to the development of the resist 4, and can be subjected to a treatment with a rinse solution after the development.

With the resist pattern 4a of the resist master serving as a mask, etching is performed on the substrate 2 to form a guide pattern master 2a. At this point, films having appropriate etching rates for transferring a pattern can be formed in the substrate 2, and an additional procedure can be carried out to transfer a pattern on those films based on the resist pattern 4a. After the remains of the resist pattern 4a used as the etching mask are removed through oxygen RIE (Reactive Ion Etching) or the like, a Ni conductive layer 3 is formed on the guide pattern master 2a through a sputtering process (see FIG. 11(d)). Electroforming is then performed based on the conductive layer 3 to form a Ni father stamper 5 that is the reverse of the guide pattern master 2a (see FIG. 11(e)). Here, the conductive layer 3 becomes a part of the father stamper 5.

After the guide pattern master 2a is detached from the father stamper 5, electroforming is performed to duplicate the father stamper 5. In this manner, a Ni mother stamper 6 having the same concavities and convexities as those of the guide pattern master 2a is obtained (see FIG. 11(f)).

After the father stamper 5 is detached from the mother stamper 6, the mother stamper 6 is injection-molded to form a resin stamper 8 (see FIG. 12(a)).

A Si substrate 10 having a photopolymer material layer 9 applied to the upper surface thereof is then prepared. After the mother stamper 6 is detached from the resin stamper 8, UV (Ultra Violet) imprint is performed on the photopolymer material layer 9 by using the resin stamper 8 (see FIG. 12(b)). Oxygen RIE is performed on the photopolymer material remaining on the portions of the Si substrate 10 pressed by the imprint to expose the surface of the Si substrate 10. In this manner, a photopolymer pattern 9a is obtained (see FIG. 12(c)).

A diblock copolymer solution is then applied to the concave portions of the photopolymer pattern 9a, and is self-assembled through annealing (see FIG. 12(d)). By utilizing the differences in etching rate among a first component that is aggregated in dots and has a high etching rate, a second component that coats the dots and has a low etching rate, and the photopolymer pattern 9a, oxygen RIE is performed to leave a pattern 9b having dots formed therein (FIG. 12(e)).

With the pattern 9b serving as a mask, RIE using $CF_4$ or oxygen is then performed on the Si substrate 10 to process the Si substrate 10. As the pattern 9b is removed, the Si substrate 10 turns into a Si master mold 10a (FIG. 12(f)). At this point, the surface of the Si substrate 10 may include films with appropriate etching rates for transferring a pattern, and an additional procedure can be carried out to transfer a pattern on those films, based on the self-assembled dot pattern 9b.

A conductive film is then formed on the surface of the Si master mold 10a, and Ni electroforming is performed to form a Ni father stamper 11 (FIG. 13(a)). After the father stamper 11 is detached from the Si master mold 10a, electroforming is performed to duplicate the father stamper 11. In this manner, a Ni mother stamper 12 is obtained (FIG. 13(b)).

The mother stamper 12 is then injection-molded to form a resin stamper 13 (FIG. 13(c)).

A magnetic disk substrate 17 having a magnetic layer 15 formed on the upper surface of the substrate 16 thereof is then prepared, and a photopolymer material is applied onto the magnetic layer 15. With the resin stamper 13, UV imprint is performed on the photopolymer material to form a photopolymer pattern 14a (FIG. 13(d)). After the resin stamper 13 is detached, ion milling is performed on the magnetic layer 15 with the photopolymer pattern 14a serving as a mask. As a result of this, a magnetic disk substrate 17a having a magnetic pattern 15a formed in the magnetic layer 15 is obtained (FIGS. 13(e) and 13(f)). A protection film can be formed over the magnetic pattern 15a, or an additional procedure can be carried out to fill concave portions such as grooves with a nonmagnetic material.

The shape of the substrate 2 forming patterns in this embodiment is not particularly limited, but the substrate 2 is preferably a disk-like silicon wafer, for example. In this disk-like silicon wafer, there can be notches and orientation flats. Other than that, it is possible to use a glass substrate, a quartz substrate, an Al-based alloy substrate, a ceramic substrate, a carbon substrate, a compound semiconductor substrate, or the like. The glass substrate can be made of amorphous glass or crystallized glass. The amorphous glass can be soda-lime glass, aluminosilicate glass, or the like. The crystallized glass can be lithium-based crystallized glass or the like. The ceramic substrate can be made of a sintered material mainly containing aluminum oxide, aluminum nitride, silicon nitride, or the like, or can be one of those sintered materials that are fiber-reinforced. The compound semiconductor substrate can be made of GaAs, AlGaAs, or the like.

The magnetic disk 17a preferably has a disk-like shape, particularly, a torus-like shape, in view of the method implemented therefor. Although the size of the magnetic disk 17a is not particularly limited, it is preferably 3.5 inches or less, so as to avoid too long lithography time with an electron beam. More preferably, the size of the magnetic disk 17a is 2.5 inches or less so that the pressing force to be used at the time of imprint does not become too strong. Only one side or both sides of the magnetic disk 17a as a magnetic disk can be used.

The inside of the magnetic disk is divided into ring-like concentric tracks, and the tracks have sectors spaced at regular intervals of a certain angle. The magnetic disk is attached to a spindle motor and is rotated so that various kinds of digital data are recorded and reproduced by a head. Therefore, while each user data track is provided in a circumferential direction, servo marks for position control are provided in directions that cross the respective tracks. Each of the servo marks includes regions such as a preamble portion, an address portion in which track or sector number information is written, and a burst portion for detecting the position of the head relative to the tracks. In addition to those regions, a gap portion can be included.

The stamper can have a disk-like shape, a torus-like shape, or some other shape. The thickness of the stamper is preferably not smaller than 0.1 mm and not greater than 2 mm. If the stamper is too thin, enough strength cannot be achieved. If the stamper is thicker than necessary, electroforming takes too long a time, or film thickness differences become larger. The size of the stamper is preferably larger than that of the medium, but is not particularly limited.

EXAMPLE

In the following, an example is described.

Referring to FIGS. 11(a) to 13(f), a stamper and a magnetic disk according to this example are described.

In the manufacture of the magnetic disk of this example, an electron beam lithography apparatus 1 is used. This electron beam lithography apparatus 1 includes an electron gun, a condenser lens, an objective lens, an electron gun emitter of a ZrO/W thermal field emission type including a blanking electrode and a deflector. The electron beam accelerating voltage is 100 kV.

Meanwhile, a positive electron beam resist is diluted with anisole, and is filtered through a 0.2-μm membrane filter. A substrate 2 that is a 6-inch silicon wafer subjected to HMDS processing is then spin-coated with the filtered resist. After that, the substrate 2 is subjected to 3-minute pre-bake at 200° C. As a result, a resist 4 of 0.04 μm in film thickness is formed on the substrate 2 (see FIG. 11(a)).

This substrate 2 is transported to a predetermined position on the stage of the electron beam lithography apparatus 1, and exposure is performed in vacuum to obtain a concentric pattern that satisfies the following conditions (see FIG. 11(b)):

Exposed portion radius: 14 mm to 28 mm
Number of sectors per track: 200
Feed per revolution: 4.25 nm
Linear velocity: 1.1 m/s (constant)
Number of zones: 14
Zone width: 1 mm A concentric circle is drawn by gradually increasing the deflection during one revolution. At the boundary portions between the servo regions and the data regions, the irradiance level of the electron beam is cyclically increased and decreased in cycles of 24 revolutions (102 nm). At this point, at the inner peripheral portion 30a of the boundary 30 shown in FIG. 1, the radius is in the range of 14 mm to 18 mm, and the irradiance level is increased in six revolutions. After that, the irradiance level is lowered in 18 revolutions. At the inner peripheral portion 32a of the boundary 32 shown in FIG. 1, the radius is in the range of 14 mm to 18 mm, and the irradiance level is increased in 18 revolutions. After that, the irradiance level is lowered in six revolutions. At the outer peripheral portion 30c of the boundary 30 shown in FIG. 1, the radius is in the range of 24 mm to 28 mm, and the irradiance level is increased in 18 revolutions. After that, the irradiance level is lowered in six revolutions. At the outer peripheral portion 32c of the boundary 32 shown in FIG. 1, the radius is in the range of 24 mm to 28 mm, and the irradiance level is increased in six revolutions. After that, the irradiance level is lowered in 18 revolutions. At each of the middle portion 30b of the boundary 30 shown in FIG. 1 and at the middle portion 32b of the boundary 32 shown in FIG. 1, the radius is in the range of 18 mm to 24 mm. The irradiance level is increased in the first 12 revolutions, and is then lowered in the second 12 revolutions. Further, latent images of the post patterns to be used for controlling the array of dots of a self-assembled material are formed by using the blanking mechanism of the electron beam lithography apparatus 1, so that cycles of 12 revolutions (=cycles of 51 nm) are set, and the pitch becomes almost 51 nm in a circumferential direction. The pitch in a circumferential direction in each zone is varied in accordance with the radius.

In this example, a self-assembled material arranged at a pitch of 20 nm is to be used. Therefore, an electron beam lithography signal pattern is formed so that the cycles of the protrusions 41 of the guide pattern shift at a pitch m times longer than the pitch of 20 nm in a circumferential direction, with respect to cycles n times longer than the cycles of the triangular protrusions 41 pitched at 102 nm in a radial direction. The shift occurs in the same direction as the servo pattern tilted in accordance with the arm's trajectory pattern to be used when incorporated into a HDD. This electron beam lithography signal pattern is set in a signal source, and electron beam lithography is performed with the signal source. At this point, m and n are varied in accordance with each radius, so that the exposure pattern at each portion closest to a boundary becomes smallest.

With the resist pattern 4a of the resist master serving as a mask, etching is then performed to form a guide pattern master 2a. Ni sputtering is performed on the guide pattern master 2a to form a conductive film 3 (see FIG. 11(d)). A Ni electroforming process based on that is performed to obtain a Ni father stamper 5 in which concavities and convexities are the reverse of those of the guide pattern master 2a (see FIG. 11(e)). The sputtering is performed for 20 seconds in a chamber in which the pressure is adjusted to 1 Pa by introducing an argon gas, and 400-W DC power is applied. The electroforming is performed with a nickel sulfamate plating solution for 90 minutes (see FIG. 11(e)). The thickness of the electroformed film 5 is 300 μm. The electroforming bath conditions are as follows:

Nickel sulfamate: 600 g/L
Boric acid: 40 g/L
Surfactant (sodium lauryl sulfate): 0.15 g/L
Solution temperature: 55° C.
pH: 4.0
Current density: 20 A/dm$^2$ After that, the resist residues are removed by oxygen plasma ashing. The oxygen plasma ashing is performed through 20-minute plasma ashing at 100 W in a chamber in which the pressure is adjusted to 4 Pa vacuum by introducing an oxygen gas at 100 ml/min (not shown), and the Ni father stamper 5 is obtained.

After that, electroforming is further performed to duplicate the father stamper 5. As a result, a Ni mother stamper 6 having the same concavities and convexities as those of the guide pattern master 2a is obtained (see FIG. 11(f)).

The mother stamper 6 is then injection-molded to form a resin stamper 8 (see FIG. 12(a)).

With the resin stamper 8, imprint involving UV irradiation of an acrylic photopolymer material 9 applied onto a Si substrate 10 is performed (see FIG. 12(b)), and etching is performed on the remaining photopolymer material through oxygen RIE. In this manner, a photopolymer pattern 9a is obtained (see FIG. 12(c)).

Further, a PS-PDMS (polystyrene-polydimethylsiloxane) diblock copolymer solution that is to be self-assembled into dots pitched at 20 nm is applied to the concave portions of the photopolymer pattern 9a. Annealing is then performed to cause the solution to be self-assembled (see FIG. 12(d)).

Figure 17:
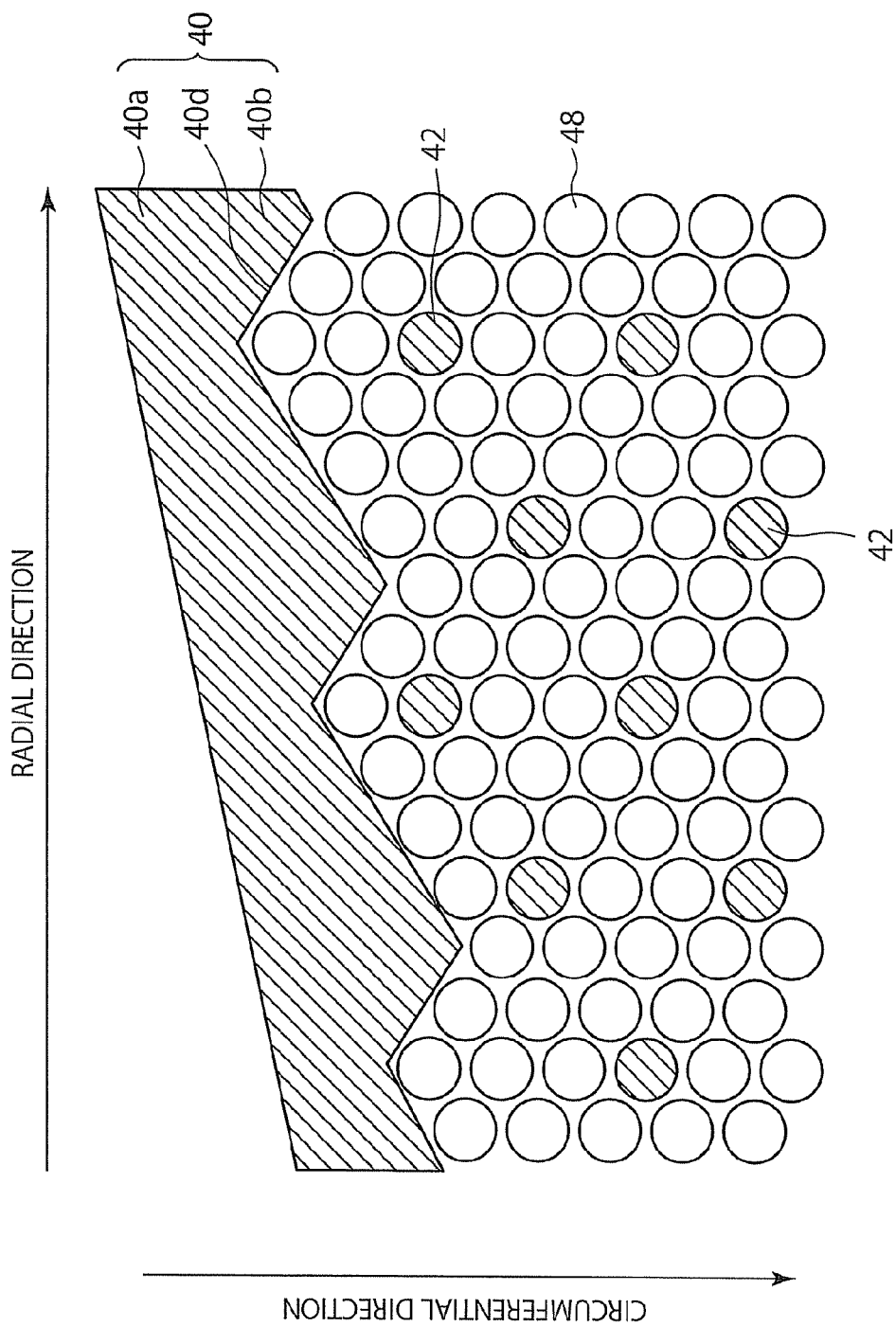
FIG. 17 is a top view of a magnetic disk manufactured by using the stamper of the first embodiment.

By utilizing the differences in etching rate among a first component that is aggregated in dots and has a high etching rate, a second component that coats the dots and has a low etching rate, and the photopolymer pattern 9a, oxygen RIE is performed to leave a pattern 9b having dots formed therein (FIG. 12(e)). With the pattern 9b serving as a mask, RIE using $CF_4$ or oxygen is then performed on the Si substrate 10 to process the Si substrate 10. As the pattern 9b is removed, the Si substrate 10 turns into a Si master mold 10a (FIG. 12(f)). The dots 48 formed here are located along the boundaries 30 of the servo regions, as shown in FIG. 17. This is supposedly because the distances between the posts 42 and the boundaries 30 are such distances as not to disturb the hexagonal array of the self-assembled dots.

A conductive film is further formed on the surface of the Si master mold 10a, and Ni electroforming is performed to form a Ni father stamper 11 (see FIG. 13(a)). After that, electroforming is performed to duplicate the father stamper 11. As a result, a Ni mother stamper 12 is obtained (see FIG. 13(b)).

The mother stamper 12 is then injection-molded to form a resin stamper 13 (see FIG. 13(c)).

A magnetic disk substrate 17 having a magnetic layer 15 formed on the upper surface thereof is then prepared, and an acrylic photopolymer material 14 is applied onto the magnetic layer 15. With the resin stamper 13, imprint involving UV irradiation is performed on the acrylic photopolymer material 14 (see FIG. 13(d)). In this manner, a photopolymer pattern 14a is formed on the photopolymer material 14. With the photopolymer pattern 14a serving as a mask, ion milling is performed on the magnetic layer 15. As a result of this, a magnetic disk 17a having a magnetic pattern 15a formed thereon is obtained (see FIGS. 13(e) and 13(f)). A protection film (not shown) is formed over the magnetic pattern 15a.

The magnetic disk is formed in the above described manner. The magnetic disk of this example is mounted on a magnetic recording/reproducing apparatus, and data signals are read out. As a result, excellent data signals are obtained in the data regions near the boundaries of the servo regions.

COMPARATIVE EXAMPLE

Figure 18:
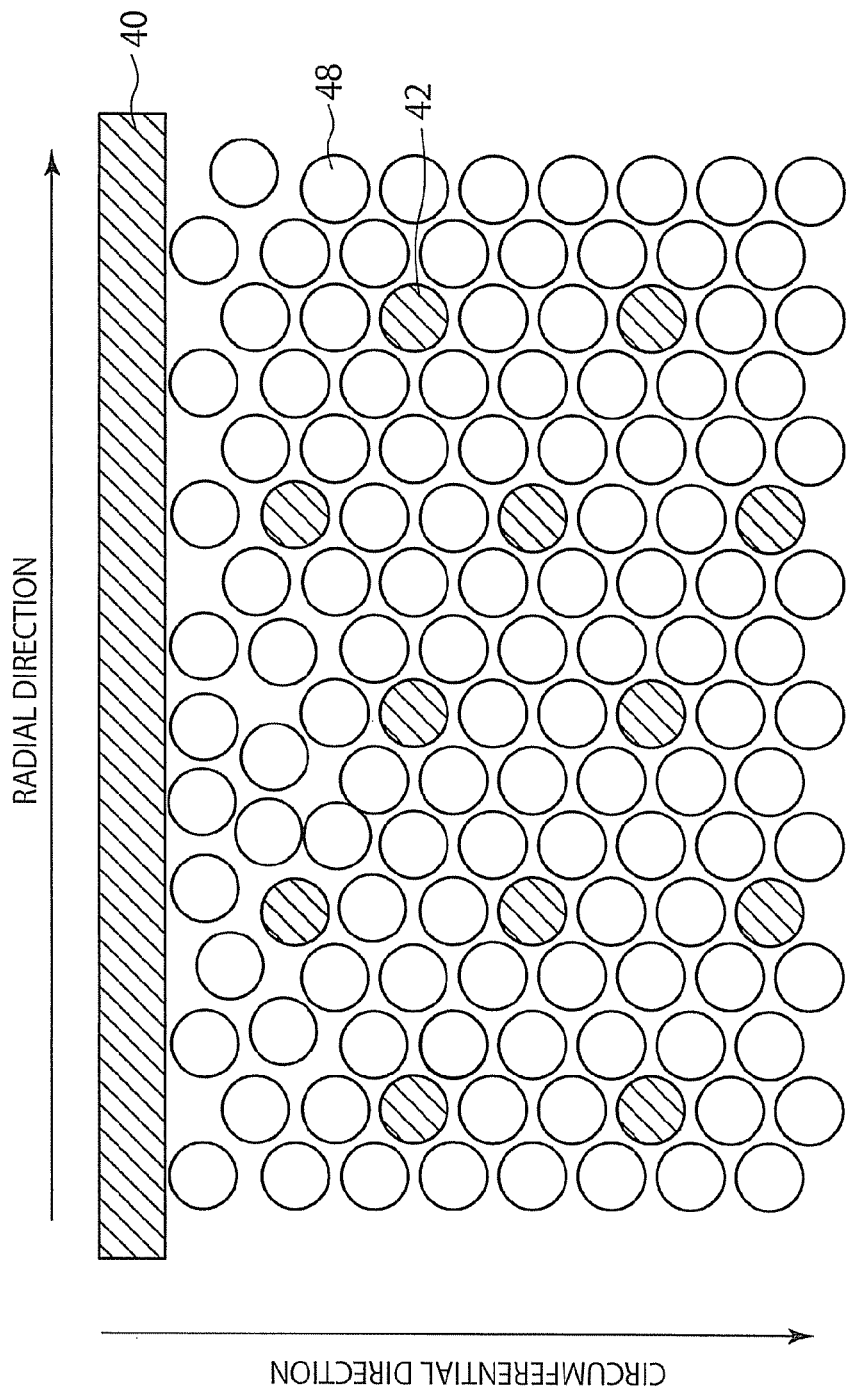
FIG. 18 is a top view of a magnetic disk manufactured by using a stamper of a comparative example.

As in the above example, the irradiation time is not particularly varied on the boundaries between the servo regions and the data regions, and lithography is performed so that the data region boundary portions 40b of guides 40 become uniform linear boundaries. After that, latent images of the guides 40 are formed in a resist 4. After that, the resist 4 is developed with a developing solution to form a resist pattern to be a resist master (see FIG. 11(c)). Thereafter, the same procedures as those of the example are carried out to form a magnetic disk of a comparative example. A protection film is formed on the magnetic pattern, as in the example. On each of the boundaries between the servo regions and the data regions in the magnetic disk of this comparative example, the array of self-assembled dots 48 is disturbed, as shown in FIG. 18.

Further, the magnetic disk of the comparative example is mounted on a magnetic recording/reproducing apparatus, and data signals are out. In the data regions near the boundaries of the servo regions, excellent data signals are not obtained, and those regions are defective regions. Also, the sizes of those defective regions vary with radiuses. Therefore, in the magnetic signals, non-magnetization signals of the servo regions are not clearly distinguished from magnetization signals of the data regions The self-assembled material should be compatible with the post pitch to be set and the required recording density. Other than PS-b-PDMS, it is possible to use PS-b-PMMA (polystyrene-block-polymethylmethacrylate), PS-b-PEO (polystyrene-block-polyethylene oxide), or the like. The post patterns for arranging the self-assembled material dots can be chemically formed, and the self-assembled material dots trapped in the post patterns may function to arrange dots of another self-assembled material. Also, the sizes of the post patterns can be varied depending on the position of the radius and the pattern type.

As described so far, according to the above embodiment and example, disturbance of the dot arrays on the boundaries between the servo regions and the data regions can be restrained.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

What is claimed is:

1. A stamper to be used for manufacturing a bit-patterned medium that includes a plurality of data regions having a plurality of tracks and a servo region located between the data regions, each of the data regions extending in a circumferential direction of the tracks, the servo region extending in a radial direction,
    the stamper comprising
    a guide comprising:
    a first portion provided in regions to be boundaries between the servo region and the data regions in the bit-patterned medium, the first portion extending in a radial direction; and
    a second portion connected to the first portion, the second portion having protrusions regularly arranged at predetermined intervals in the radial direction, each of the protrusion having and being located on sides of regions to be the data regions,
    wherein, of angles formed between at least one of two sides of the triangular shape and a straight line extending in the radial direction, the smaller angle is in the range of 10 to 50 degrees, the two sides extending from a vertex of one of the protrusions.

2. The stamper according to claim 1, wherein, of the angles formed between the respective two sides of the triangular shape and the straight line extending in the radial direction, the smaller angles are in the range of 10 to 50 degrees.

3. The stamper according to claim 1, wherein a plurality of posts each having a convex shape are provided in regions to be the data regions, and at least one of those posts exists in every 300 nm square.

4. The stamper according to claim 1, wherein the guide further comprises a third portion in regions to be the data region, the third portion extending from the second portion in a circumferential direction.

5. A stamper to be used for manufacturing a bit-patterned medium that includes a plurality of data regions having a plurality of tracks and a servo region located between the data regions, each of the data regions extending in a circumferential direction of the tracks, the servo region extending in a radial direction,
    the stamper comprising
    a guide comprising:
    a first portion provided in regions to be boundaries between the servo region and the data regions in the bit-patterned medium, the first portion extending in a radial direction; and
    a second portion connected to the first portion, the second portion having protrusions regularly arranged at predetermined intervals in the radial direction, each of the protrusion having and being located on sides of regions to be the data regions,
    wherein a length ratio between two sides of the triangular shape varies with radius, the two sides extending from a vertex of one of the protrusions.

6. The stamper according to claim 5, wherein a plurality of posts each having a convex shape are provided in regions to be the data regions, and at least one of those posts exists in every 300 nm square.

7. The stamper according to claim 5, wherein the guide further comprises a third portion in regions to be the data region, the third portion extending from the second portion in a circumferential direction.

8. A magnetic disk of a bit-patterned type including a plurality of data regions having a plurality of tracks and a servo region located between the data regions, each of the data regions extending in a circumferential direction of the tracks, the servo region extending in a radial direction,
    the magnetic disk comprising
    a guide comprising:
    a first portion provided in boundary regions between the servo region and the data regions, the first portion extending in a radial direction; and
    a second portion connected to the first portion, the second portion having protrusions regularly arranged at predetermined intervals in the radial direction, each of the protrusion having and being located on sides of the data regions,
    wherein, of angles formed between at least one of two sides of the triangular shape and a straight line extending in the radial direction, the smaller angle is in the range of 10 to 50 degrees, the two sides extending from a vertex of one of the protrusions.

9. The disk according to claim 8, wherein, of the angles formed between the respective two sides of the triangular shape and the straight line extending in the radial direction, the smaller angles are in the range of 10 to 50 degrees.

10. The disk according to claim 8, wherein, when a magnetic head mounted on a top end portion of an arm of a magnetic recording/reproducing apparatus having the magnetic disk mounted thereon operates while drawing an arc-like trajectory on the magnetic disk in accordance with an angle at which the arm operates, a smaller angle $\theta$ of angles formed by a tangent line of the trajectory in a position of a radius r and a radial direction of the magnetic disk is in the range expressed as:

$$(m-1)p < nA \tan \theta \leq mp$$

where A represents one cycle equivalent to one of the protrusions in a radial direction, p represents pitch of magnetic dots in the data regions, and m and n are natural numbers, wherein, in the position of the radius r, cycles of the protrusions in a circumferential direction shift by mp in a circumferential direction, which is the same as a trajectory direction of the arm, with respect to each one cycle nA of n triangular shapes in a radial direction.

11. A magnetic disk including a plurality of data regions and a servo region located between adjacent ones of the data regions, the magnetic disk comprising
a guide comprising:
a first portion provided in boundary regions between the servo region and the data regions, the first portion extending in a radial direction; and
a second portion connected to the first portion, the second portion having protrusions regularly arranged at predetermined intervals in the radial direction, each of the protrusion having and being located on sides of the data regions, wherein a length ratio between two sides of the triangular shape varies with radius, the two sides extending from a vertex of one of the protrusions.

12. The disk according to claim 11, wherein, when a magnetic head mounted on a top end portion of an arm of a magnetic recording/reproducing apparatus having the magnetic disk mounted thereon operates while drawing an arc-like trajectory on the magnetic disk in accordance with an angle at which the arm operates, a smaller angle θ of angles formed by a tangent line of the trajectory in a position of a radius r and a radial direction of the magnetic disk is in the range expressed as:

$$(m-1)p < nA \tan \theta \leq mp$$

where A represents one cycle equivalent to one of the protrusions in a radial direction, p represents pitch of magnetic dots in the data regions, and m and n are natural numbers, wherein, in the position of the radius r, cycles of the protrusions in a circumferential direction shift by mp in a circumferential direction, which is the same as a trajectory direction of the arm, with respect to each one cycle nA of n triangular shapes in a radial direction.

* * * * *